(12) United States Patent
Peng et al.

(10) Patent No.: US 7,495,907 B2
(45) Date of Patent: Feb. 24, 2009

(54) MOUNTING APPARATUS FOR STORAGE DEVICE

(75) Inventors: Wen-Tang Peng, Taipei-Hsien (TW); Mo-Ming Yu, Shenzhen (CN); Zong-Yuan Li, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 87 days.

(21) Appl. No.: 11/684,638

(22) Filed: Mar. 12, 2007

(65) Prior Publication Data

US 2007/0217144 A1   Sep. 20, 2007

(51) Int. Cl.
*G06F 1/16* (2006.01)
(52) U.S. Cl. ...................................... 361/685; 361/683
(58) Field of Classification Search .................. 361/685
See application file for complete search history.

(56) References Cited

U.S. PATENT DOCUMENTS 6,115,245 A * 9/2000 Ruch et al. .................. 361/685
6,700,776 B2 * 3/2004 Bang et al. .................. 361/683
6,999,308 B2 * 2/2006 Hsu ............................ 361/685
7,204,469 B2 * 4/2007 Chen et al. .................. 361/685
7,369,403 B2 * 5/2008 Chen et al. .................. 361/685
2005/0185370 A1 * 8/2005 Chung ........................ 361/683
2006/0279925 A1 * 12/2006 Shi et al. ..................... 361/685
2007/0019377 A1 * 1/2007 Chen et al. .................. 361/685
2007/0159785 A1 * 7/2007 Lai ............................. 361/685
2007/0167071 A1 * 7/2007 Peng et al. ................ 439/541.5

FOREIGN PATENT DOCUMENTS

CN            2461044 Y      11/2001

* cited by examiner

*Primary Examiner*—Lisa Lea-Edmonds
(74) *Attorney, Agent, or Firm*—Wei Te Chung (57) ABSTRACT

A mounting apparatus for a storage device, includes a first bracket for accommodating the storage device therein, a chassis for slidably securing the first bracket therein, a locking member including a pivotable portion, a blocking portion pivotable about an axis of the pivotable portion for urging the first bracket, and a connecting portion interconnecting the pivotable portion and the blocking portion, and a bearing connected to the chassis for pivotably supporting the pivotable portion of the locking member.

21 Claims, 6 Drawing Sheets

MOUNTING APPARATUS FOR STORAGE DEVICE

BACKGROUND OF THE INVENTION

1. Field of the Invention

The present invention relates to mounting apparatuses, and more particularly to a mounting apparatus for at least one electronic storage device.

2. Description of Related Art

An electronic apparatus, such as a typical desktop computer, generally includes storage devices, such as hard disk drives, compact disk drives, digital video disk drives, floppy disk drives, and the like. These storage devices are typically added to increase functionalities of the electronic apparatus as desired by users. However, the installation of such storage devices in the electronic apparatus is labor-intensive.

The installation of a storage device in a computer typically involves the use of a great number of screws or bolts to attach the storage device to a bracket of a computer chassis. Generally, these screws or bolts are too small to be easily manipulated and installed. Additionally, because of their small size, the screws or bolts are easily dropped by an assembler, into the computer.

What is desired, therefore, is a mounting apparatus which conveniently holds brackets in a computer chassis with a small quantity of screws or bolts.

SUMMARY OF THE INVENTION

A mounting apparatus for an electronic storage device, includes a first bracket for accommodating the storage device therein, a chassis for slidably securing the first bracket therein, a locking member including a pivotable portion, a blocking portion pivotable about an axis of the pivotable portion for urging the first bracket, a connecting portion interconnecting the pivotable portion and the blocking portion, and a bearing connected to the chassis for pivotably supporting the pivotable portion of the locking member.

Other advantages and novel features will become more apparent from the following detailed description of preferred embodiments when taken in conjunction with the accompanying drawings, in which:

DETAILED DESCRIPTION OF THE INVENTION

Figure 1:
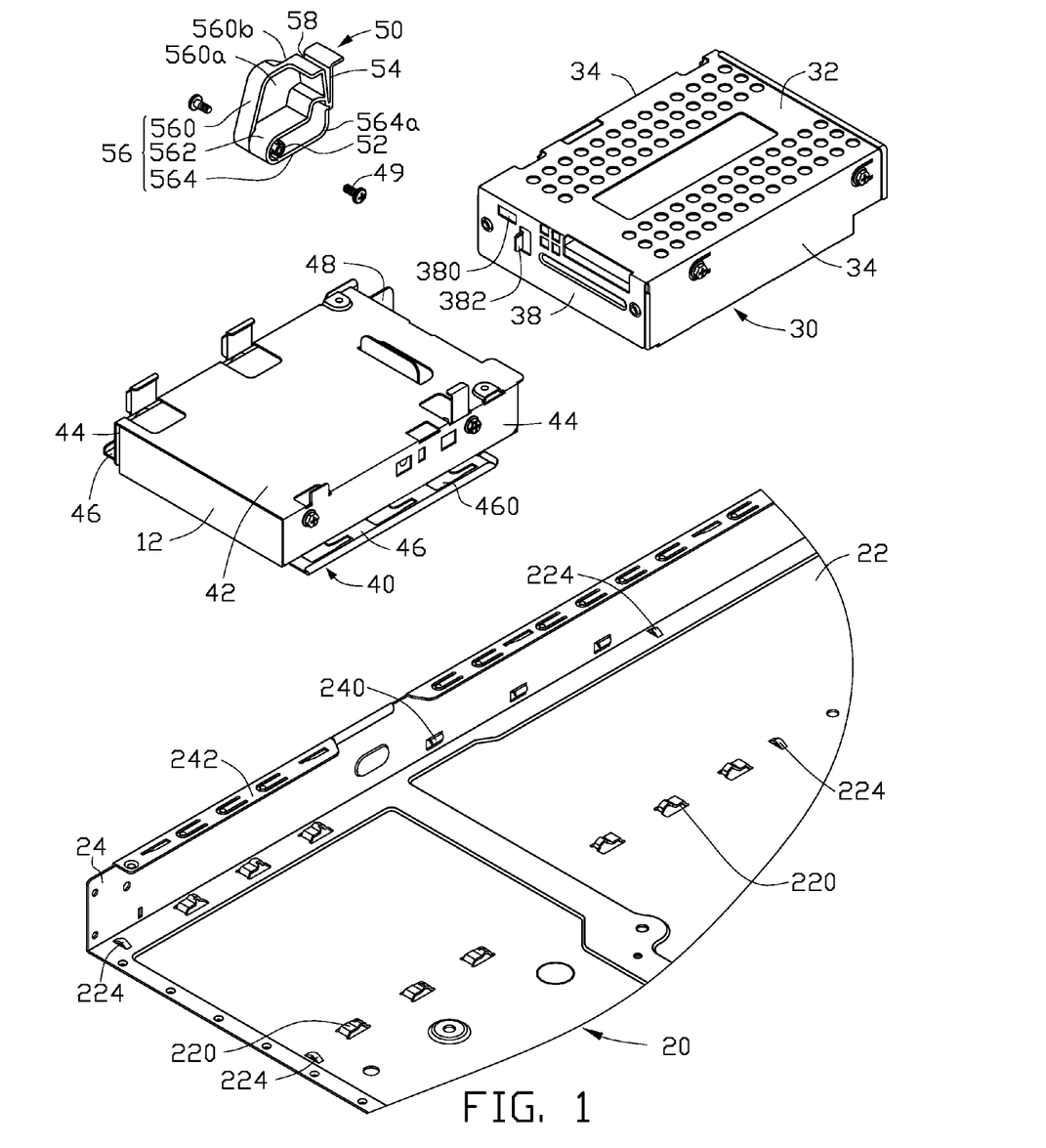
FIG. 1 is an exploded, isometric view of a mounting apparatus, a first storage device, and a second storage device in accordance with a first embodiment.
Figure 2:
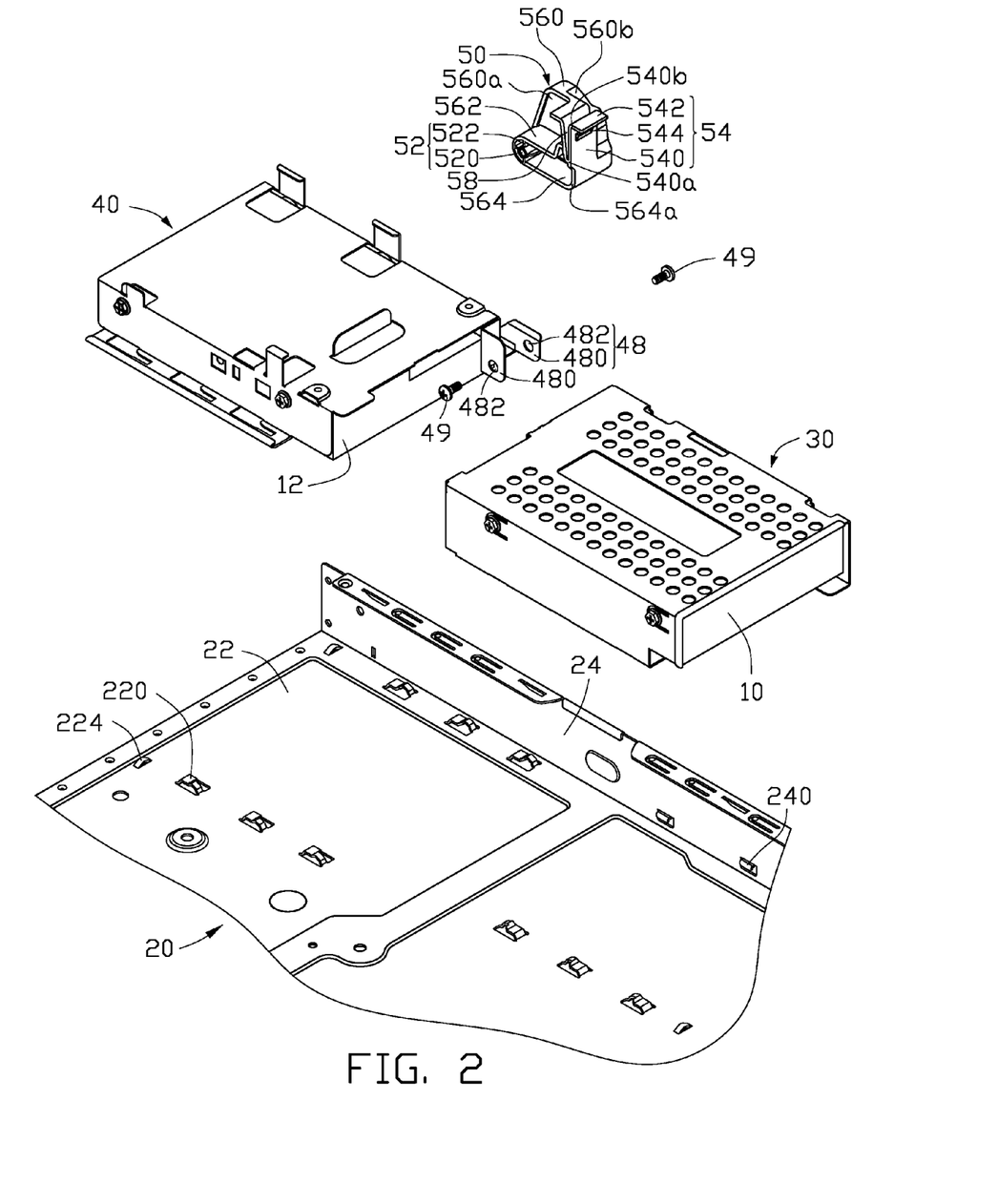
FIG. 2 is similar to FIG. 1, but viewed from another aspect.
Figure 3:
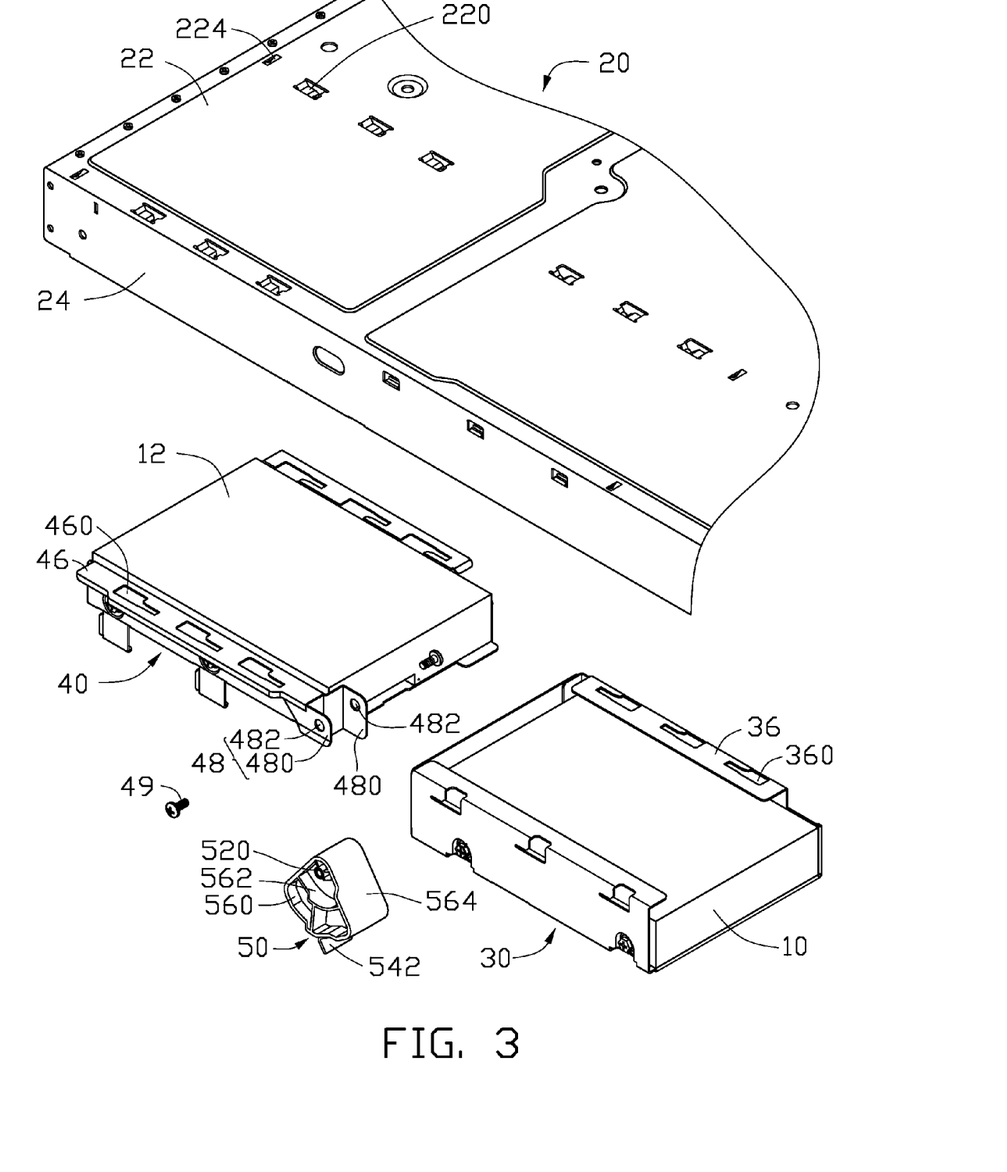
FIG. 3 is an inverse view of the mounting apparatus, the first storage device, and the second storage device of FIG.1.

Referring to FIGS. 1 to 3, in a first embodiment, a mounting apparatus for holding a first storage device 10 and a second storage device 12 in place is illustrated. The mounting apparatus includes a chassis 20, a first bracket 30 accommodated in the chassis 20 for receiving the first storage device 10, a second bracket 40 accommodated in the chassis 20 for receiving the second storage device 12, and a locking member 50 arranged between the first bracket 30 and the second bracket 40.

The chassis 20 includes a bottom plate 22, and a first sidewall 24 substantially perpendicularly extending from the bottom plate 22. A plurality of (e.g. nine) spaced first clasps 220 are punched upward in the bottom plate 22. These first clasps 220 are separated into three clasp groups: a first clasp group, a second clasp group, and a third clasp group. Each clasp group includes several (e.g. three) first clasps 220 arranged in a line that is parallel to the first sidewall 24. The first clasp group and the second clasp group are spaced away from the first sidewall 24 a similar distance. The third clasp group is adjacent to the first sidewall 24 and face to the second clasp group. Each first clasp 220 may be generally a curved T-shaped bridge connected to the bottom plate 22 at two opposite ends thereof. A plurality of spaced second clasps 240 are punched inward in the first sidewall 24. The plurality of spaced second clasps 240 is arranged in a line to define a fourth clasp group corresponding to the first clasp group. Each second clasp 240 is generally inverted L-shaped and connected to the first sidewall 24 at one end thereof. A blocking protrusion 224 is arranged adjacent to an end of each clasp group. The blocking protrusions 224 are punched upward in the bottom plate 22 for blocking the first bracket 30 and the second bracket 40.

The first bracket 30 for securing the first storage device 10 is substantially U-shaped, and includes a first top plate 32, two second sidewalls 34 substantially perpendicularly extending from two opposite sides of the first top plate 32 respectively, and an end wall 38 substantially perpendicularly interconnecting ends of the two second sidewalls 34. Two first flanges 36 are respectively and oppositely bent inward from corresponding bottom portions of the two second sidewalls 34. Each first flange 36 defines a line of first T-shaped slots 360 therein for engagably receiving the corresponding first clasps 220 or the second clasps 240 therein. A locking hole 380 is defined in the end wall 38. A guiding tab 382 is punched outward from the end wall 38 for guiding the locking member 50 to engagably insert in the locking hole 380.

The second bracket 40 for securing the second storage device 12 is substantially U-shaped, and includes a second top plate 42, two third sidewalls 44 substantially perpendicularly extending from two opposite sides of the second top plate 42 respectively, two second flanges 46 oppositely bent outward from corresponding bottom portions of the two third sidewalls 44, and a bearing 48 attached to a distal end of one third sidewall 44 for supporting the locking member 50. Each second flange 46 defines a line of second slots 460 therein for engagably receiving the corresponding first clasps 220 therein. The bearing 48 includes a pair of spaced supporting arms 480. Each supporting arm 480 defines a bearing hole 482 therein for a shaft such as a bolt 49 or a rivet to insert therethrough.

The locking member 50 includes a pivotable portion 52 pivotably supported between the pair of supporting arms 480, a blocking portion 54 opposite to the pivotable portion 52 for engaging in the corresponding locking hole 380, and a connecting portion 56 interconnecting the pivotable portion 52 and the blocking portion 54.

The pivotable portion 52 includes a tube 520 for the bolts 49 inserting therein, a plurality of ribs 522 radially extending from a circumference of the tube 520 to the connecting portion 56 for supporting the tube 520.

The connecting portion 56 includes a first strip 560, a second strip 562, and a third strip 564. The first strip 560, the second strip 562, and the third strip 564 join each other to construct a first juncture adjacent to the pivotable portion 52. The plurality of ribs 522 connects the tube 520 to inner surfaces of the second strip 562, and the third strip 564. The first strip 560, the second strip 562, and the third strip 564 extend from the first juncture and join at a second juncture which is connected to a fixed end of the blocking portion 54. The first strip 560, the second strip 562, and the third strip 564 are spaced from each other between the first juncture and the second juncture for improving strength of the locking member 50. The first strip 560 and the third strip 564 are arranged at opposite upper and lower sides of the second strip 562 between the first juncture and the second juncture. The second strip 562 and the third strip 564 are substantially parallel to each other between the first juncture and the second juncture. A cutout 560a is defined in the first strip 560 extending from the first juncture to a portion adjacent the second juncture which results in the first strip 560 being narrower near the first juncture than near the second juncture. The cutout 560a is configured for preventing the first strip 560 from being stopped by a corner 420 (shown in FIG.4) of the second bracket 40 when the locking member 50 rotates. A recessed portion 560b is defined in the first strip 560 adjacent to the second juncture for preventing a third flange 242 extending from the first sidewall 24 from obstructing the first strip 560 when the locking member 50 rotates. The second strip 562 and the third strip 564 have uniform width from the first juncture to the second juncture. The first strip 560, the second strip 562, and the third strip 564 are constructed as curved shapes for improving resiliency of the locking member 50. The third strip 564 includes a substantially arc-shaped portion 564a for allowing the locking member 50 to smoothly rotate to resiliently contact the end wall 38.

The blocking portion 54 is substantially L-shaped, and includes a fourth strip 540 and a handle 542 bent from the fourth strip 540. The fourth strip 540 includes a fixed end 540a and an opposite free end 540b. The fixed end 540a is connected to the second juncture of the connecting portion 56. The handle 542 is bent from the free end 540b in a direction away from the connecting portion 56. A third clasp 544 is punched outward in the fourth strip 540 for engaging in the locking hole 380 in the end wall 38. The fourth strip 540 is narrower than the third strip 564 for fully exposing the recessed portion 560b and preventing the fourth strip 540 from impacting the third flange 242 when the locking member 50 rotates. A V-shaped space 58 is formed between the connecting portion 56 and the blocking portion 54 for allowing pressing the blocking portion 54 toward the connecting portion 56 when detaching the third clasp 544 from the locking hole 380.

Figure 4:
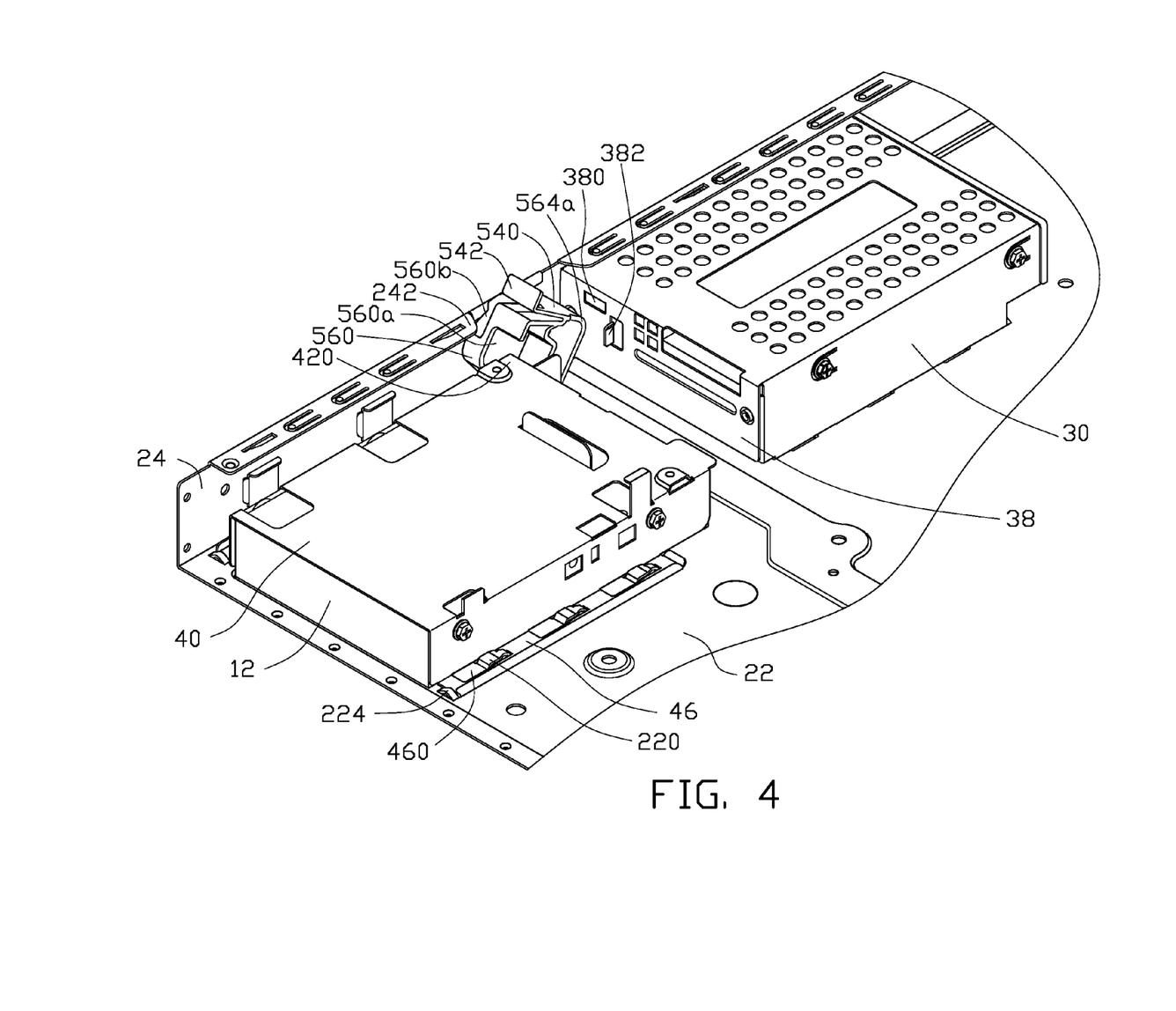
FIG. 4 is an assembled view of the mounting apparatus of FIG. 1.
Figure 5:
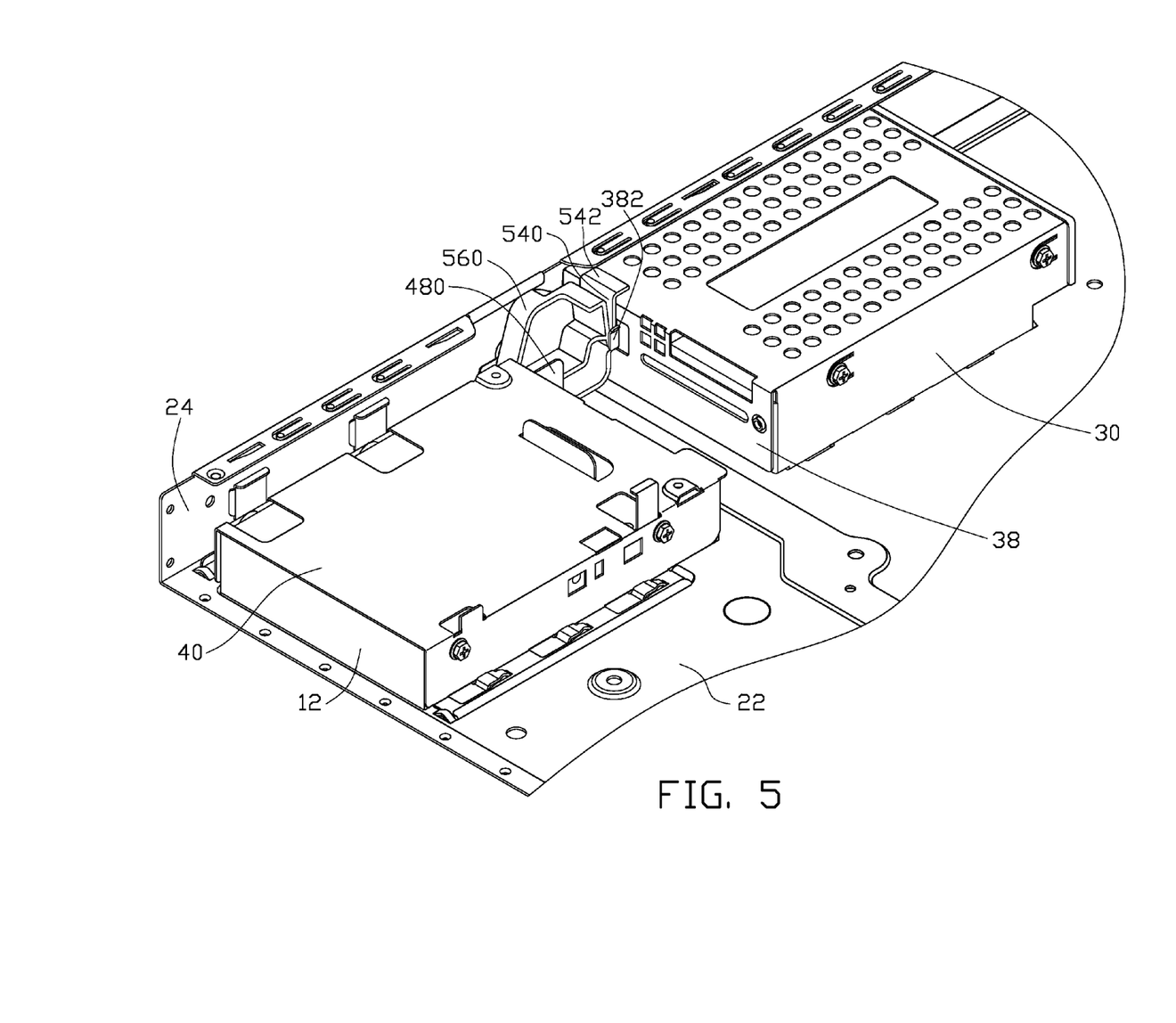
FIG. 5 is an assembled view of FIG. 1, showing the first storage device and the second storage device held in place.

Referring to FIGS. 4 and 5, in assembly of the mounting apparatus, the locking member 50 is attached to the bearing 48 of the second bracket 40, with a pair of bolts 49 extending through the corresponding bearing holes 482 to engage with the tube 520 of the locking member 50. The first bracket 30 is placed in the chassis 20, with the first group of first clasps 220 and the second clasps 240 of the chassis 20 extending through the corresponding first slots 360 of the first bracket 30. The first storage device 10 is secured in the first bracket 30. The first bracket 30 with the first storage device 10 mounted therein is pushed along the line consisting of the first clasp group until the ends of the first flanges 36 abut the blocking protrusions 224 and the first group of clasps 220 and the second clasps 240 are engaged in the narrower portions of the first slots 360 of the first flanges 36. The first bracket 30 is thus secured relative to the first group of clasps 220 in a direction perpendicular to the line consisting of the first clasp group. The second bracket 40 is placed opposite to the first bracket 30 in the chassis 20, with the first and third groups of first clasps 220 of the chassis 20 extending through the corresponding second slots 460 of the second bracket 40. The second storage device 12 is secured in the second bracket 40. The second bracket 40 is pushed along the line consisting of the second clasp group until the ends of the second flanges 46 abut the blocking protrusions 224 and the second and third group of clasps 220 are engaged in the narrower portions of the second slots 460 of the first flanges 46. The second bracket 40 is thus secured relative to the first group of clasps 220 in a direction perpendicular to the line consisting of the first clasp group.

Referring also to FIG. 4, the locking member 50 has a first position where it is apart from the first bracket 30. In use, pressure is applied to the handle 542 of the blocking portion 54 to rotate the locking member 50 around the tube 520 of the pivotable portion 52. The third strip 564 contacts the end wall 38, and urges the first bracket 30 to move away from the second bracket 40. The guiding tab 382 guides the fourth strip 540 to resiliently urge the end wall 38 causing the third clasp 544 on the fourth strip 540 to engage in the locking hole 380 in the end wall 38. As shown in FIG. 5, the locking member 50 thus arrives at a second position where the third clasp 544 engages in the locking hole 380 in the end wall 38 to block the first bracket 30 from moving toward the second bracket 40 thereby preventing the first clasps 220 and the second clasps 240 disengaging from the first slots 360 of the first flanges 36. In the same way, the second bracket 40 is blocked from moving toward the first bracket 30 thereby preventing the second and third groups of clasps 220 disengaging from the second slots 460 of the second flanges 46. The first bracket 30 with the first storage device 10 therein and the second bracket 40 with the second storage device 12 therein are thus conveniently secured in the chassis 20 together.

To detach the first bracket 30 and the second bracket 40 from the chassis 20, the locking member 50 is rotated to disengage from the locking hole 380 in the end wall 38 allowing the first bracket 30 to be drawn to disengage the first clasps 220 and the second clasps 240 from the first slots 360 in the first flange 36. Thus, the first bracket 30 can be taken away from the bottom plate 22 of the chassis 20. The second bracket 40 is subsequently removed from the bottom plate 22 of the chassis 20 after the first clasps 220 disengage from the second slots 460 of the second flanges 46.

Figure 6:
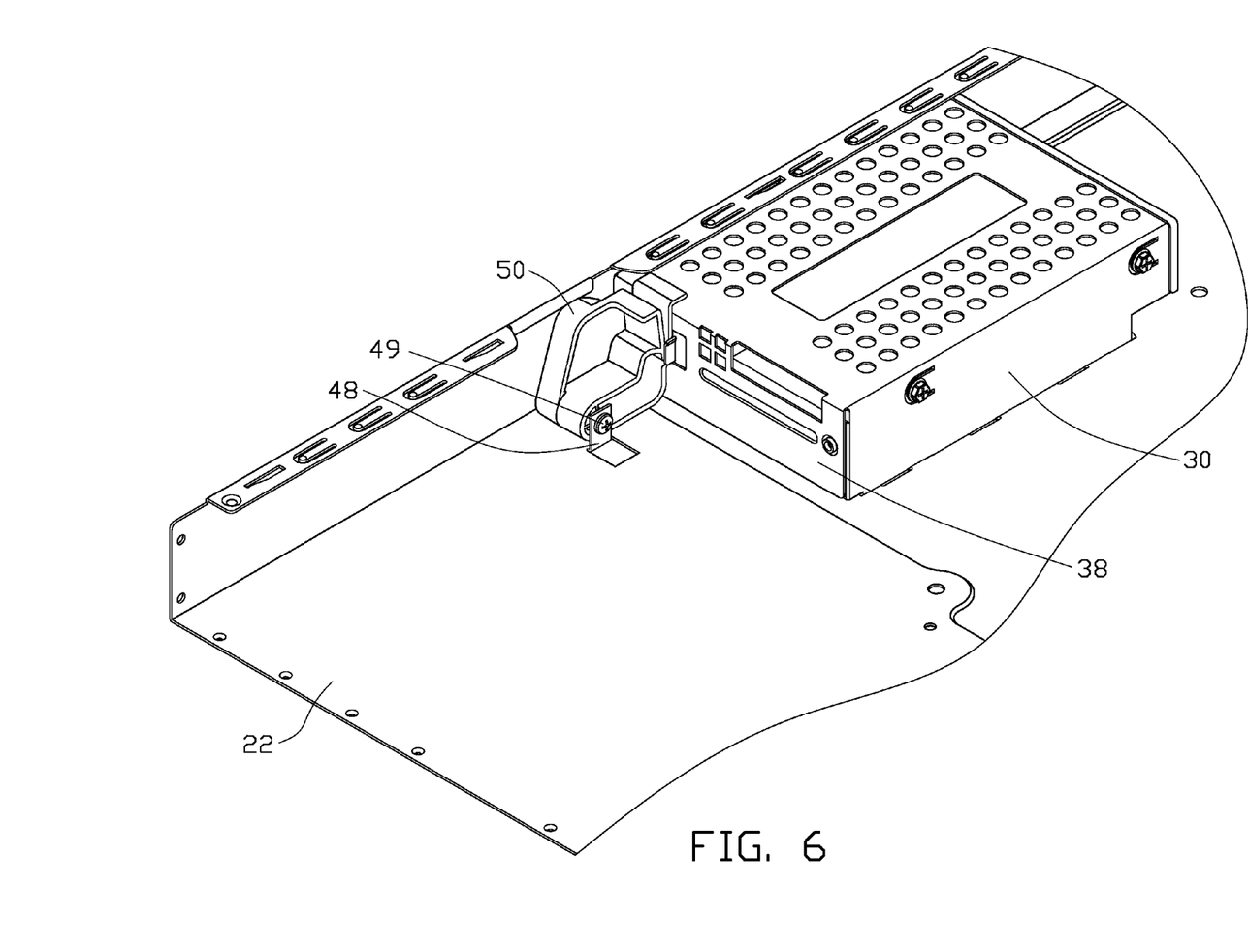
FIG. 6 is an isometric view of a mounting apparatus and a storage device in accordance with a second embodiment.

Referring also to FIG. 6, a second embodiment in accordance with the mounting apparatus is illustrated. The bearing 48 is directly mounted on the bottom plate 22 instead of being attached to the second bracket 40. Therefore, the locking member 50 may be utilized with only one bracket provided.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for a storage device, comprising:
    a first bracket configured for accommodating the storage device therein;
    a chassis configured for slidably securing the first bracket therein;
    a locking member comprising a pivotable portion, a blocking portion pivotable about an axis of the pivotable portion and configured for urging the first bracket to secure the first bracket to the chassis, and a connecting portion interconnecting the pivotable portion and the blocking portion; and
    a bearing fixed relative to the chassis and configured for pivotably attaching the locking member to the chassis via pivotably connected to the pivotable portion of the locking member.

2. The mounting apparatus as claimed in claim 1, wherein the connecting portion comprises a plurality of strips configured for allowing the blocking portion to resiliently urge the first bracket.

3. The mounting apparatus as claimed in claim 2, wherein the plurality of strips connect to each other at the pivotable portion, and are spaced apart from each other between the pivotable portion and the blocking portion, and meet at the blocking portion.

4. The mounting apparatus as claimed in claim 3, wherein a first one of the plurality of strips includes an arc-shaped portion, and is configured for allowing the locking member to smoothly rotate to a position where the blocking portion resiliently engages with a wall of the first bracket.

5. The mounting apparatus as claimed in claim 2, wherein the blocking portion includes a fixed end connected to the connecting portion, a free end opposite to the fixed end, a handle portion bent from the free end and configured for being operated to rotate the locking member, and a first locking portion positioned on the blocking portion, the first bracket comprises a second locking portion for detachably engaging with the first locking portion.

6. The mounting apparatus as claimed in claim 5, wherein a V-shaped space is formed between the connecting portion and the blocking portion configured for allowing pressing the blocking portion toward the connecting portion when detaching the first locking portion from the second locking portion.

7. The mounting apparatus as claimed in claim 5, wherein the connecting portion is rotatable about the pivotable portion between a locked position where the first locking portion is engaged with the second locking portion and a released position where the first locking portion is disengaged from the second locking portion.

8. The mounting apparatus as claimed in claim 5, wherein the first bracket further comprises a first sidewall, and a guiding portion protruding from the first sidewall for guiding rotation of the locking member between the locked position and the released position.

9. The mounting apparatus as claimed in claim 2, wherein the pivotable portion includes a tube for a shaft inserting therein, a plurality of ribs radially extending from a circumference of the tube for interconnecting the tube and an inner surface of at least one of the plurality of strips.

10. The mounting apparatus as claimed in claim 1, wherein the bearing comprises a pair of supporting arms arranged at two opposite sides of the pivotable portion of the locking member, each supporting arm defines a hole therein for a bolt to extend therethrough, each side of the pivotable portion defines a hole aligned with the holes of the supporting arm for allowing the bolt to engage therein.

11. The mounting apparatus as claimed in claim 8, further comprising a second bracket for receiving a second storage device, the second bracket comprising a second sidewall facing the first sidewall, the bearing being attached to the second sidewall in a manner so as to allow the locking member to be pivotably secured thereto.

12. The mounting apparatus as claimed in claim 11, wherein the locking member is arranged between the first sidewall and the second sidewall, and configured for urging the first bracket and the second bracket to move along two opposite directions.

13. The mounting apparatus as claimed in claim 11, wherein a cutout is defined in a second one of the plurality of strips from the pivotable portion to a portion adjacent to the blocking portion configured for preventing the second one of the plurality of strips from being stopped by a corner of the second bracket when the locking member is rotated between the locked position and the released position.

14. The mounting apparatus as claimed in claim 11, wherein the chassis includes a plurality of clasps, each of the first bracket and the second bracket includes a pair of flanges extending oppositely and substantially parallel to the chassis, each of the pair of flanges defines a plurality of slots therein for the clasps to slidably engage in.

15. The mounting apparatus as claimed in claim 14, wherein a plurality of blocking protrusions are arranged at the chassis and configured for blocking the first bracket and the second bracket from sliding when the clasps are engaged in the slots.

16. A mounting apparatus for a storage device, comprising:
a chassis configured for receiving the storage device therein, the storage device being movable between a first position where the storage device is free to be removed from the chassis and a second position where the storage device is slidably engaged with the chassis; and
a locking member comprising a pivotable portion pivotably connected to the chassis, a blocking portion, and a connecting portion interconnecting the pivotable portion and the blocking portion, the blocking portion being rotatable about an axis of the pivotable portion between a third position where the blocking portion urges and engages with the first storage device which results in the first storage device being blocked from sliding at the second position and a fourth position where the blocking portion is disengaged from the first storage device which results in the first storage device being capable of sliding from the second position to the first position.

17. The mounting apparatus as claimed in claim 16, wherein the connecting portion comprises a plurality of strips configured for allowing the blocking portion to resiliently urge the first bracket.

18. The mounting apparatus as claimed in claim 17, wherein the plurality of strips connect to each other at the pivotable portion, spaced from each other between the pivotable portion and the blocking portion, and meet at the blocking portion.

19. The mounting apparatus as claimed in claim 16, wherein the blocking portion includes a fixed end attached to the connecting portion, a free end opposite to the fixed end, a handle portion bent from the free end and configured for being operated to rotate the locking member, the blocking portion is rotatable about the fixed end, and a first locking portion is formed at the blocking portion, the first bracket comprises a second locking portion for detachably engaging with the first locking portion.

20. A mounting apparatus assembly comprising:
a chassis comprising first and second spaces, and a plurality of clasps provided at the first and second spaces;
a first bracket with a first storage device mounted therein slidably received in the first space and slidably engaging with some of the clasps in such a manner that the first bracket is movable relative to the clasps in a first direction and secured relative to the clasps in a second direction perpendicular to the first direction;
a second bracket with a second storage device mounted therein slidably received in the second space and slidably engaging with the other of the clasps in such a manner that the second bracket is movable relative to the other of the clasps in a third direction opposing to the first direction and secured relative to the other of the clasps in the second direction; and
a locking member pivotably attached to one of the chassis, the first bracket and the second bracket and positioned between the first and second bracket to block the first bracket from moving in the first direction and the second bracket from moving in the third direction.

21. The mounting apparatus assembly as claimed in claim 20, the locking member comprises a pivotable portion attached to said one of the chassis, the first bracket and the second bracket and located adjacent to one of the first and second brackets, a blocking portion latched with the other one of the first and second brackets, and a connecting portion interconnecting the pivotable portion and the blocking portion, at least one of the blocking portion and the connecting portion being deformable to allow the blocking portion detaching from the other one of the first and second bracket via deformation of the at least one of the blocking portion and the connecting portion.

* * * * *